(12) United States Patent
Bokeno et al.

(10) Patent No.: US 11,520,357 B2
(45) Date of Patent: *Dec. 6, 2022

(54) PACKAGE DELIVERY BY MEANS OF AN AUTOMATED MULTI-COPTER UAS/UAV DISPATCHED FROM A CONVENTIONAL DELIVERY VEHICLE

(71) Applicant: Workhorse Group Inc., Loveland, OH (US)

(72) Inventors: Elliot T. Bokeno, Fairfield, OH (US); Thaddeus M. Bort, Jr., Maineville, OH (US); Stephen S. Burns, Maineville, MI (US); Martin Rucidlo, Mason, OH (US); Wei Wei, Mason, OH (US); Donald L. Wires, Loveland, OH (US)

(73) Assignee: Workhorse Group Inc., Sharonville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/398,139

(22) Filed: Aug. 10, 2021

(65) Prior Publication Data

US 2021/0365051 A1 Nov. 25, 2021

Related U.S. Application Data

(63) Continuation of application No. 15/915,144, filed on Mar. 8, 2018, now Pat. No. 11,086,338, which is a
(Continued)

(51) Int. Cl.
*G05D 1/10* (2006.01)
*B64C 39/02* (2006.01)
(Continued)

(52) U.S. Cl.
CPC .............. *G05D 1/102* (2013.01); *B60L 53/53* (2019.02); *B64C 39/024* (2013.01); *B64F 1/362* (2013.01);
(Continued)

(58) Field of Classification Search
None
See application file for complete search history.

(56) References Cited

U.S. PATENT DOCUMENTS

| 7,673,831 B2 | 3/2010 | Steele et al. | |
| 9,051,043 B1 * | 6/2015 | Peeters | H04L 67/12 |

(Continued)

*Primary Examiner* — Richard G Davis
(74) *Attorney, Agent, or Firm* — Taft Stettinius & Hollister LLP

(57) ABSTRACT

Methods and associated systems for autonomous package delivery utilize a UAS/UAV, an infrared positioning senor, and a docking station integrated with a package delivery vehicle. The UAS/UAV accepts a package for delivery from the docking station on the delivery vehicle and uploads the delivery destination. The UAS/UAV autonomously launches from its docked position on the delivery vehicle. The UAS/UAV autonomously flies to the delivery destination by means of GPS navigation. The UAS/UAV is guided in final delivery by means of a human supervised live video feed from the UAS/UAV. The UAS/UAV is assisted in the descent and delivery of the parcel by precision sensors and if necessary by means of remote human control. The UAS/UAV autonomously returns to the delivery vehicle by means of GPS navigation and precision sensors. The UAS/UAV autonomously docks with the delivery vehicle for recharging and preparation for the next delivery sequence.

20 Claims, 12 Drawing Sheets

Related U.S. Application Data continuation of application No. 14/989,870, filed on Jan. 7, 2016, now Pat. No. 9,915,956.

(60) Provisional application No. 62/101,542, filed on Jan. 9, 2015.

(51) Int. Cl.
  *B64F 1/36* (2017.01)
  *B60L 53/53* (2019.01)
  *B60L 53/00* (2019.01)

(52) U.S. Cl.
  CPC ........... *B60L 53/00* (2019.02); *B60L 2200/10* (2013.01); *B60L 2200/36* (2013.01); *B60L 2240/622* (2013.01); *B64C 2201/027* (2013.01); *B64C 2201/042* (2013.01); *B64C 2201/08* (2013.01); *B64C 2201/128* (2013.01); *B64C 2201/141* (2013.01); *B64C 2201/18* (2013.01); *B64C 2201/208* (2013.01); *Y02T 10/7072* (2013.01); *Y02T 10/72* (2013.01); *Y02T 90/14* (2013.01); *Y02T 90/16* (2013.01)

(56) References Cited

U.S. PATENT DOCUMENTS

| | | | |
|---|---|---|---|
| 9,244,147 | B1 | 1/2016 | Soundararajan et al. |
| 2002/0156645 | A1 | 10/2002 | Hansen |
| 2014/0032034 | A1 | 1/2014 | Raptopoulos et al. |
| 2014/0149244 | A1 | 5/2014 | Abhyanker |
| 2014/0254896 | A1 | 9/2014 | Zhou et al. |
| 2016/0068267 | A1* | 3/2016 | Liu .................. B64C 19/00 701/4 |
| 2016/0236778 | A1* | 8/2016 | Takayama ............... B64D 1/02 |
| 2017/0372256 | A1* | 12/2017 | Kantor ................ G08G 5/0043 |

* cited by examiner

PACKAGE DELIVERY BY MEANS OF AN AUTOMATED MULTI-COPTER UAS/UAV DISPATCHED FROM A CONVENTIONAL DELIVERY VEHICLE

CROSS REFERENCE TO RELATED APPLICATION

This is a continuation of U.S. patent application Ser. No. 15/915,144, filed Mar. 3, 2018 which claimed the benefit of U.S. patent application Ser. No. 14/989,870, filed Jan. 7, 2016, which issued as U.S. Pat. No. 9,915,956 on Mar. 13, 2018 which claimed the benefit of U.S. Provisional Patent Application Ser. No. 62/101,542, filed on Jan. 9, 2015. Each of these prior applications is hereby incorporated by reference in its entirety.

BACKGROUND OF THE INVENTION

This invention relates to systems and associated methods of package delivery.

Present day package delivery systems utilize a delivery vehicle, typically (but not limited to) a step van manufactured by any number of suppliers, that originates a daily delivery route from a depot, traverses a typical geographical route throughout the day, and returns to the same depot at the end of the day's delivery cycle. One major drawback of such a delivery system is the significant amount of fuel utilized by the delivery vehicle because it is required to physically travel to and from each delivery site, irrespective if there are multiple packages or just a single package to be delivered there and irrespective of the proximity of each delivery site relative to other delivery sites.

These requirements and inherent inefficiencies of present delivery schemes significantly increase the cost of package delivery. In addition, the uncertainty of traffic and weather conditions detrimentally impacts the reliability of package delivery schedules.

SUMMARY OF THE INVENTION

In various embodiments, this invention is directed to methods and associated systems for autonomous package delivery utilizing, but not limited to: a multi-rotor unmanned aircraft system (UAS) and/or unmanned aerial vehicle (UAV), an infrared positioning senor, Lidar and global positioning system (GPS) controlled docking station/launch flight path controlled platform integrated with a conventional package delivery vehicle. The UAS/UAV accepts a package for delivery from a mobile launch platform on the vehicle, and uploads the delivery destination as confirmed by the courier via a bar code or QR code reading system. The UAS/UAV autonomously launches from its docked position on the delivery vehicle. The UAS/UAV autonomously dispatches to the delivery destination by means of GPS navigation. The UAS/UAV is guided in final delivery by means of a human supervised live video feed from the UAS/UAV. The UAS/UAV is assisted in the descent and delivery of the parcel by precision land sensors and if necessary by means of remote human control. The UAS/UAV autonomously returns to the delivery vehicle by means of GPS navigation and precision land sensors. The UAS/UAV autonomously docks with the delivery vehicle for recharging and in preparation of the next delivery sequence. The UAS/UAV may recharge its batteries by means of the main propulsion batteries of an electric powered delivery vehicle, but may be recharged by other means in vehicles with differing propulsion systems.

One embodiment of this invention utilizes a delivery van with an opening port in the roof, along with associated launching and retrieval hardware, configured in such a way as to allow an operator to load a package into the payload compartment of the UAS/UAV from inside the delivery vehicle. After the package is loaded into the UAS/UAV's payload compartment, the intended package destination is uploaded into the UAS/UAV system. When the delivery system, delivery vehicle and the UAS/UAV are within range of the destination, the UAS/UAV is released via the launching system within the delivery van. The UAS/UAV autonomously guides itself via GPS to a predetermined distance from the destination and is remotely guided by aid of precision land sensors and if necessary an operator at a remote location to the final delivery point for package release. Having completed the package release, the UAS/UAV autonomously returns to the delivery vehicle via GPS and is guided into its docking mechanism via infrared sensing devices or other sensors located on the UAS/UAV and delivery vehicle.

A method for parcel delivery according to various embodiments of this invention utilizes a multi-rotor UAS/UAV, dispatched from a delivery van, and controlled by a combination of automated GPS navigation and human guidance. In the one embodiment of the invention, a UAS/UAV is dispatched from the delivery vehicle with a package, ascends to a designated flight ceiling, and autonomously navigates to the corresponding address by means of GPS navigation. At the designated precise delivery GPS location, the system enables a set of cameras to transmit live video to a remote human operator, who monitors the descent and package drop-off, and is available to intervene, if necessary, to avoid potential interference with any obstacle in the designated drop-off area. After delivery, the UAS/UAV autonomously returns to the designated flight ceiling, navigates to the new position of the delivery vehicle, autonomously descends and docks with the delivery vehicle. Once docked the UAS/UAV recharges its batteries from the vehicle's power supply infrastructure in preparation for the next delivery. This invention may utilize an electric or range-extended electric delivery vehicle as its dispatch and retrieval platform, for the electric powered UAS/UAV "Horsefly." It is understood that a fossil fuel delivery vehicle and/or fossil fuel powered UAS/UAV may be substituted as alternative embodiments of the invention.

One advantage to this system and method of package delivery over current parcel delivery systems and methods is the inherent reduction in miles driven by a delivery van to cover a given geographical area. Current methods of parcel delivery require a delivery van to arrive at each point of drop off or retrieval for each parcel. This invention requires only that the delivery vehicle arrive in an area adjacent to several drop off or retrieval points at which point a single or multiple UAS/UAV's is/are dispatched to complete the deliveries while the delivery vehicle remains stationary or moves to another area. The various embodiments of this invention for parcel delivery allow for parcels to be delivered to remote areas or longer distances without having to move the delivery vehicle to the destination. This invention results in substantial fuel savings and lower operating costs than those associated with conventional parcel delivery schemes. While delivery vehicles in their current gasoline-powered configuration can only achieve around 6 mpg in fuel economy, a small UAS/UAV would require relatively little energy in flight, reducing delivery costs for some sections of a daily route from around $1.00 per mile of delivery cost, to around $0.03-0.04 per mile for the UAS/UAV only and around $0.30 when you combine the use of an electric delivery vehicle with the UAS/UAV.

Rather than dispatching large numbers of UAS/UAV's from a central parcel-sorting warehouse, this invention utilizes the large delivery vehicles already in use for larger deliveries, allowing for fewer numbers of UAS/UAVs to be used for deliveries over a larger area, while keeping the round-trip distances for a single UAS/UAV relatively short. The constantly moving "home base" for each UAS/UAV allows for more complex delivery schedules and eliminates significant empty drive-time from a single courier's day.

One unique aspect of various embodiments of this invention is that once the delivery vehicle is loaded and departs the depot, it deploys its UAS/UAV to reach destinations that are further removed from the delivery truck's normal route or would require a significant amount of fuel and time for the delivery van to reach. In addition to saving fuel and maintenance costs for the delivery vehicle, this invention provides a method to deliver packages to remote areas not accessible to delivery vehicles. It is understood that this invention may also be used to deliver food, medicine, or any other number of goods to a remote site from a mobile platform.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

This invention will be described more fully hereafter with reference to the accompanying drawings, in which various embodiments of the invention will be described, but it is understood that other components of equal functionality may be substituted for the embodiments described herein. A package delivery system 10 includes a delivery vehicle 12 which departs from a central depot (not shown), traverses to a general delivery area, deploys packages throughout the designated area making one or more stops, 150 stops are not uncommon. On many routes there are outliers, delivery destinations 14 that are not neatly clustered in proximity to the delivery vehicle 12, hence the delivery vehicle in prior systems must traverse a greater distance to service these locations using more fuel and resulting in greater maintenance of the delivery vehicle. This invention greatly reduces fuel consumption and delivery vehicle maintenance cost by deploying one or more UAS/UAV's 16 from the delivery vehicle 12 to more distant locations once the delivery vehicle arrives to the general package delivery area 18.

Figure 1:
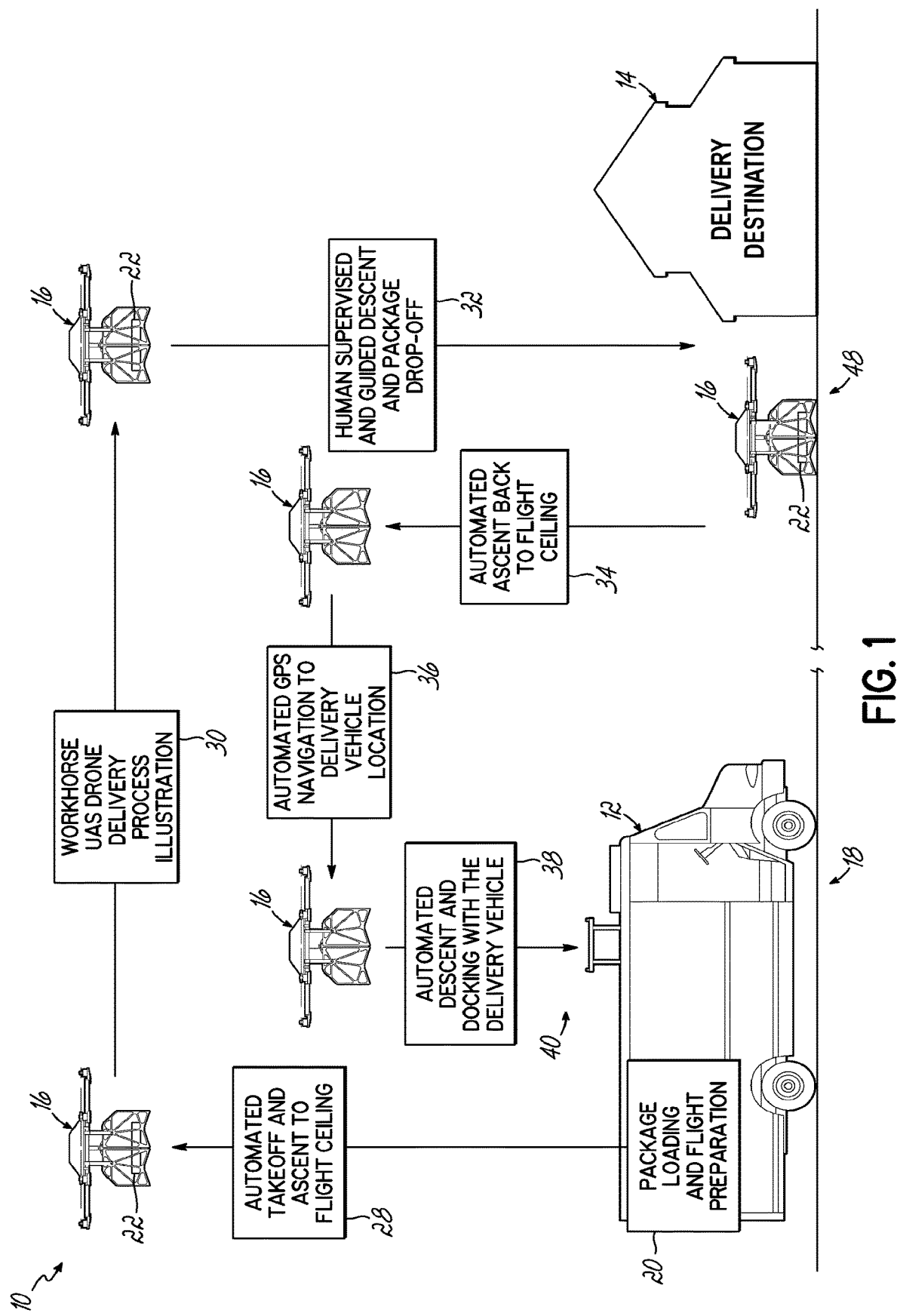
FIG. 1 shows the overall concept of one embodiment of this invention in its various operating modes, described as phases 1 through 7.
Figure 2:
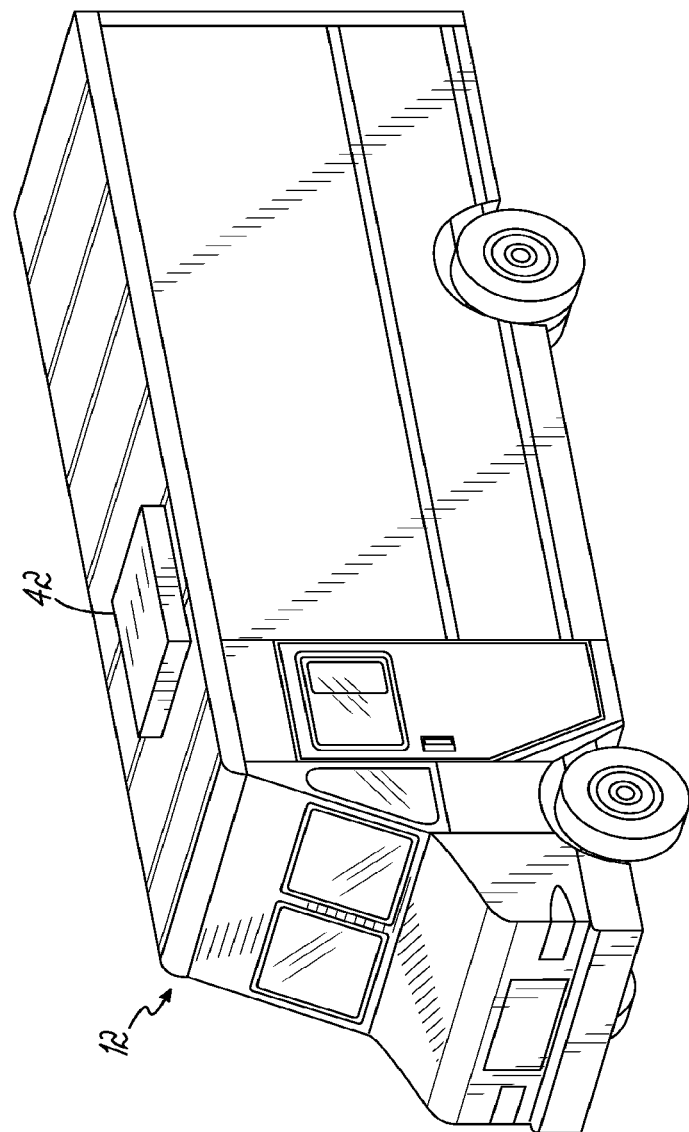
FIG. 2 is a perspective view of one embodiment of this invention of a delivery vehicle with the UAS/UAV landing system installed with a sliding debris guard affixed to the roof of the delivery vehicle to protect the UAS/UAV while it is in the nesting position within the vehicle.
Figure 3:
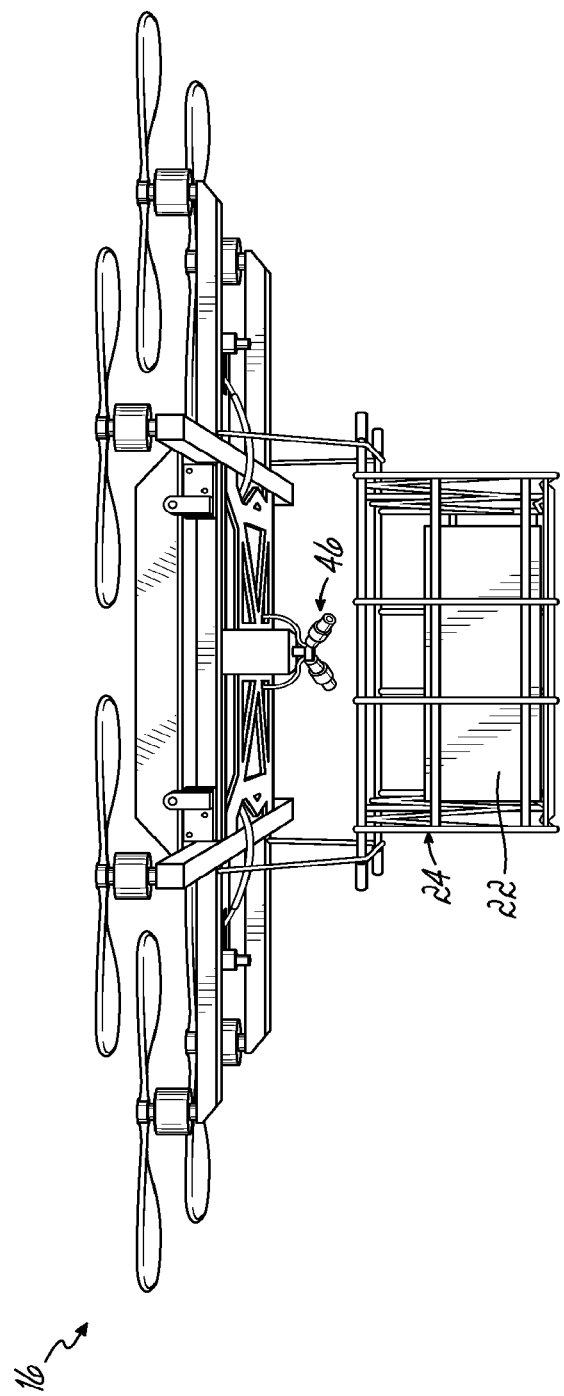
FIG. 3 is a perspective view of one embodiment of a package delivery UAS/UAV along with its associated package holding mechanism with a package therein.

It is understood that in addition to package delivery applications such as those customary for fleet package delivery services, this invention may be used to deliver parcels from maintenance or emergency vehicles to locations that may be inaccessible to normal ground vehicles. FIG. 1 is an overview of one embodiment of the parcel delivery system 10 and associated method according to this invention. FIG. 1 shows the overall concept of this invention in its various operating modes, phases 1 through 7.

Phase 1 is the package loading and flight preparation mode 20. A package 22 is loaded into a package holding mechanism 24 of the UAS/UAV 16 inside the delivery vehicle 12 and the delivery destination 14 is uploaded to an onboard flight control system 26. The UAS/UAV 16 may utilize a bar code or QR code and appropriate reader within the vehicle 12 and the bar or QR code affixed to the package 22. It is understood that alternative methods of uploading the delivery destination 14 data may be employed, such as via wireless means.

Phase 2 of FIG. 1 is the automatic takeoff sequence 28 of the UAS/UAV 16 from the delivery vehicle 12 and its ascent to the prescribed flight ceiling prior to the UAS/UAV's traverse to the package delivery destination 14. Phase 3 of FIG. 1 is the autonomous flight 30 via GPS guidance of the UAS/UAV 16 to a location in close proximity to the final delivery destination 14 and package drop off point. Phase 4 of FIG. 1 is human intervention into the final guided descent phase and package drop-off sequence 32. Phase 5 of FIG. 1 is the autonomous ascent to the prescribed flight ceiling 34 prior to the flight back to the delivery vehicle 12. Phase 6 of FIG. 1 is the autonomous GPS navigation controlled flight 36 of the UAS/UAV 16 back to the delivery vehicle 12. Phase 7 of FIG. 1 is the autonomous descent and docking sequence 38 of the UAS/UAV 16 with the delivery vehicle 12 at its present location, which may be a different location than that of Phase 2.

Figure 6:
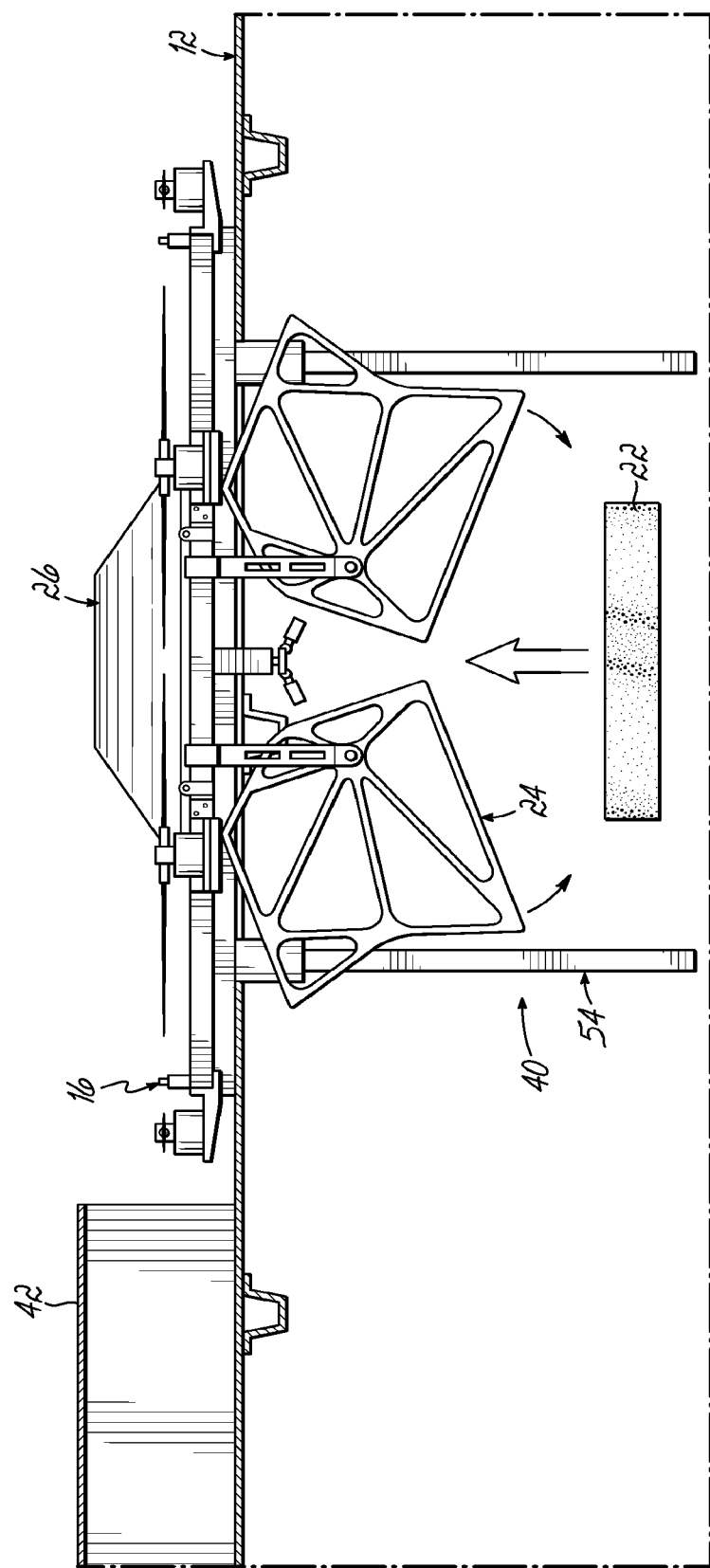
FIG. 6 is a partial cross-sectional view of the UAS/UAV in its docked position in the delivery vehicle with the UAS/UAV package holding mechanism in the open position and the landing platform in the lowered position to accept a package for loading into the UAS/UAV.
Figure 7:
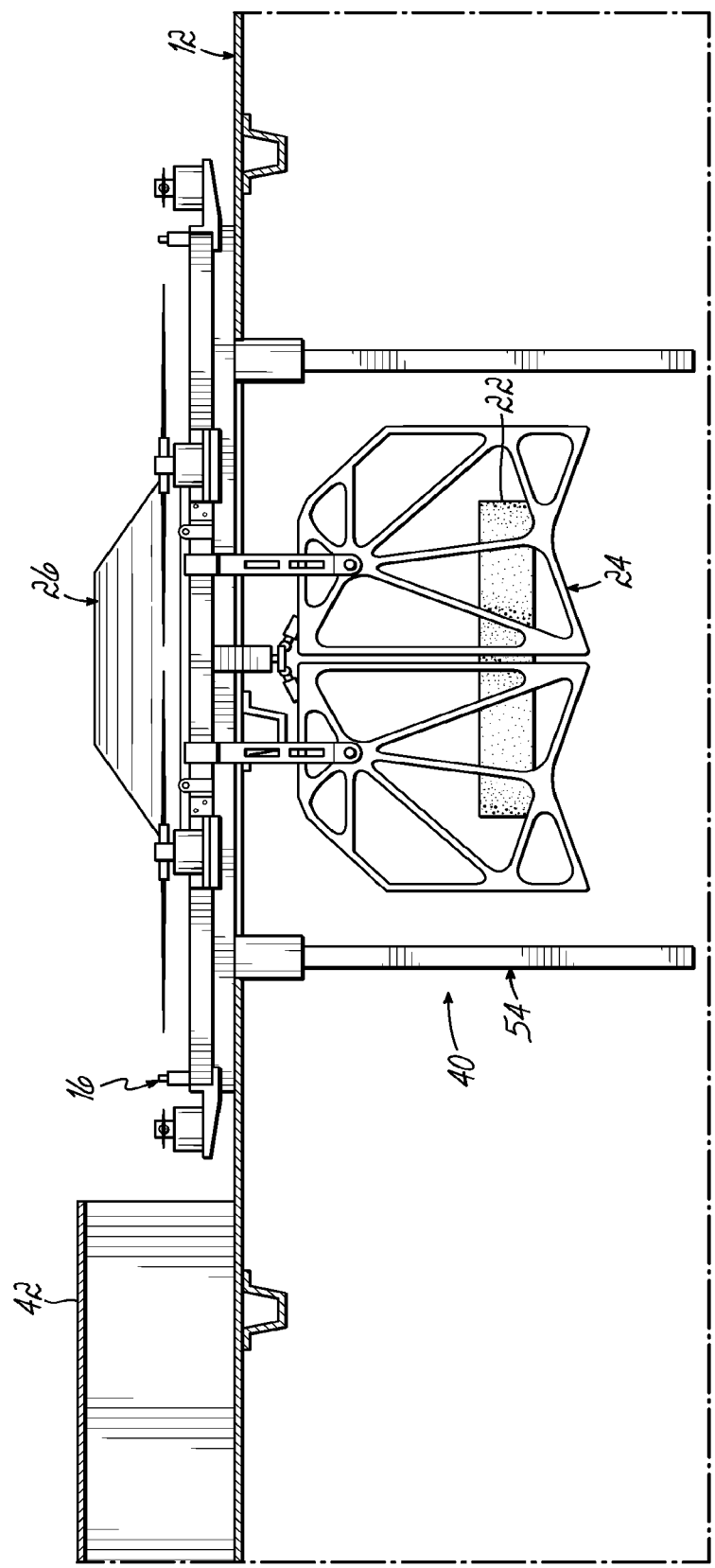
FIG. 7 is a view similar to FIG. 6 with the UAS/UAV in its docked and lowered position within the delivery vehicle and its package holding mechanism closed to contain the package for flight.

During Phase 1 when the delivery vehicle 12 arrives within the general delivery area 18 and it is appropriate to deploy the UAS/UAV 16 to a remote delivery destination 14, with the UAS/UAV 16 in the docked position on a docking station 40 and the package holding mechanism 24 in the load position as depicted in FIGS. 6 and 7, the delivery vehicle operator may scan a bar code on the package 22 containing the GPS coordinates of the delivery destination 14. This bar code data contained within an electronic storage media within the delivery vehicle 12 may be transmitted to the UAS/UAV 16 via a wireless transmission utilizing both the internet and cellular networks.

Figure 4:
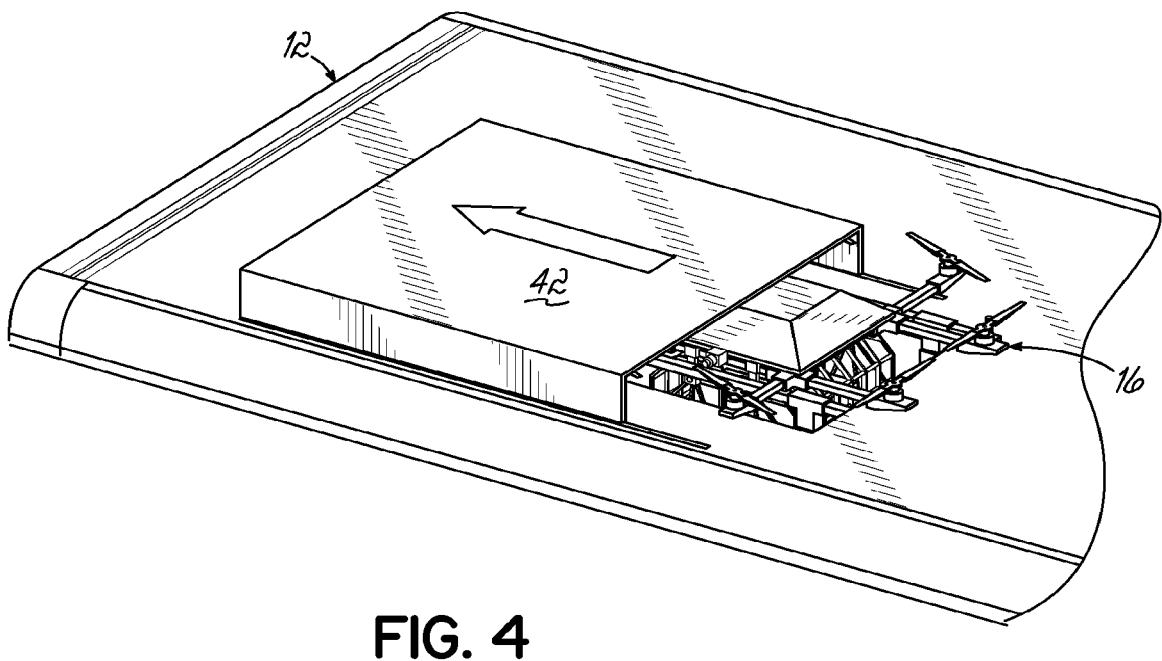
FIG. 4 is a perspective view of one embodiment of the loading mechanism's debris door in a retract mode so as to allow the loading of the UAS/UAV.
Figure 5:
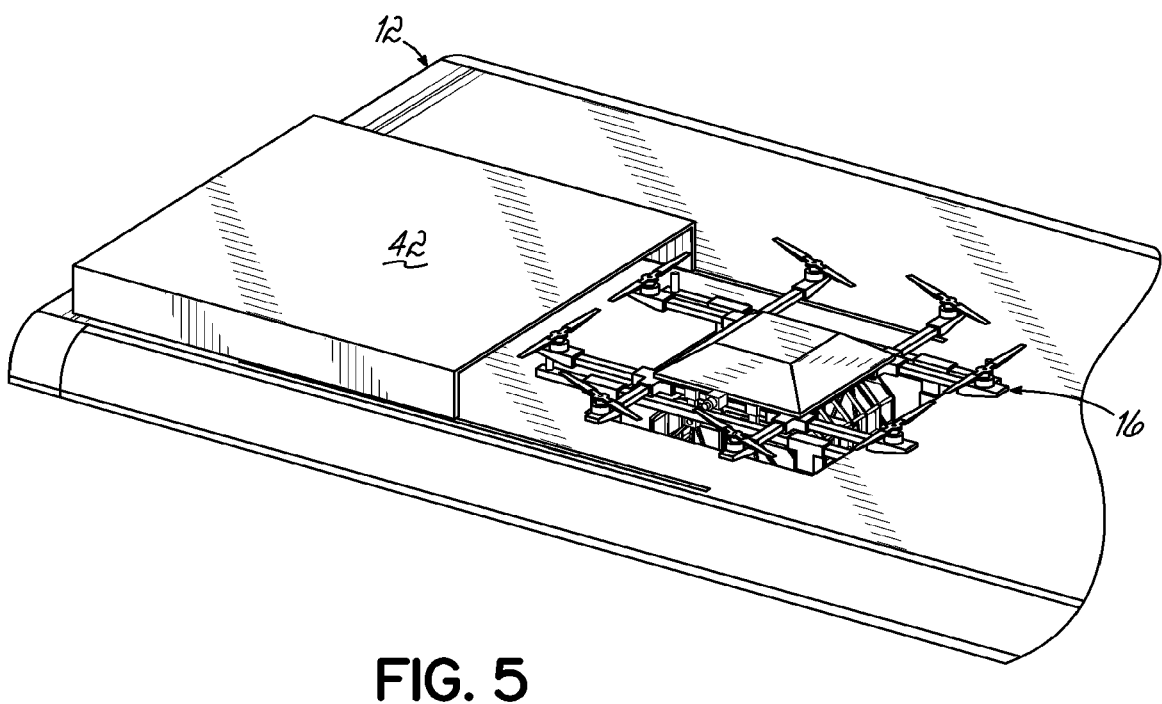
FIG. 5 is a view similar to FIG. 4 with the debris cover fully retracted and the UAS/UAV in the lowered position.

With the package 22 loaded into the package holding mechanism 24 on the UAS/UAV 16 and the delivery destination coordinates uploaded via a wireless network into the flight control system 26 contained within the UAS/UAV 16, a debris cover 42 on the delivery vehicle 16 is retracted to expose the UAS/UAV 16 in a lowered position as depicted in FIGS. 4 and 5.

Figure 8:
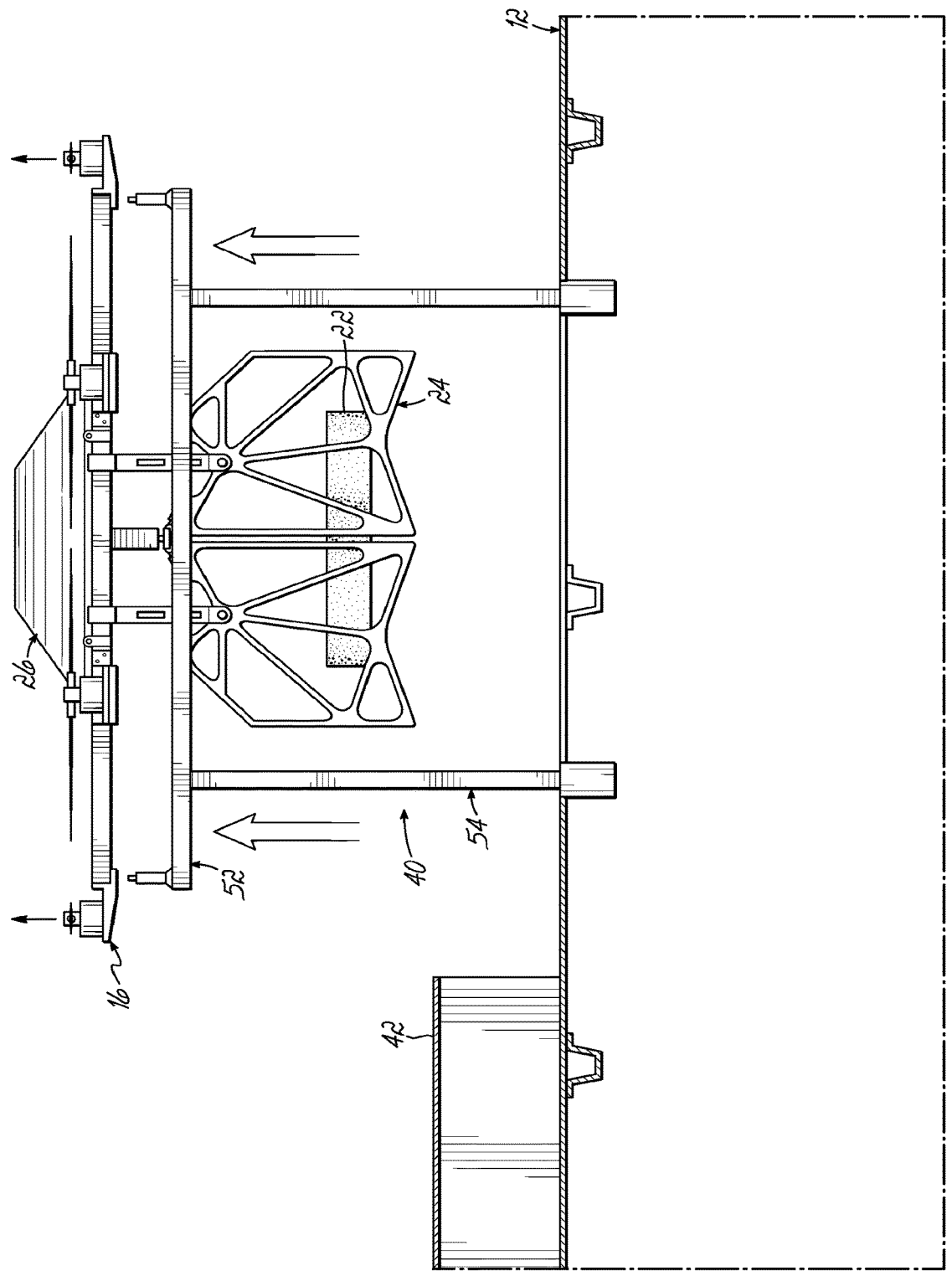
FIG. 8 is a view similar to FIGS. 6-7 with the UAS/UAV on the landing platform with a package contained within the package holding mechanism and the landing platform extended to the launch/landing position above a roof line of the package delivery vehicle.
Figure 9:
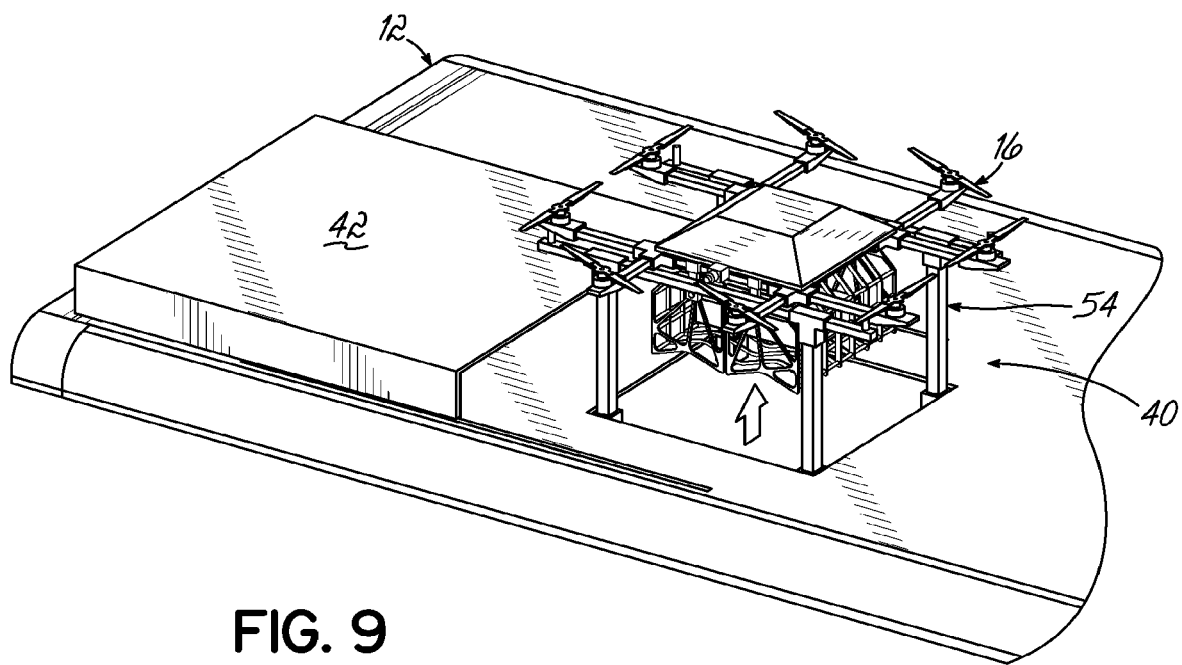
FIG. 9 is a perspective view of the UAS/UAV in the launch position above the delivery vehicle with the package contained within the package holding mechanism of the UAS/UAV and the flight path and destination GPS coordinates of the package destination loaded into the UAS/UAV.
Figure 10:
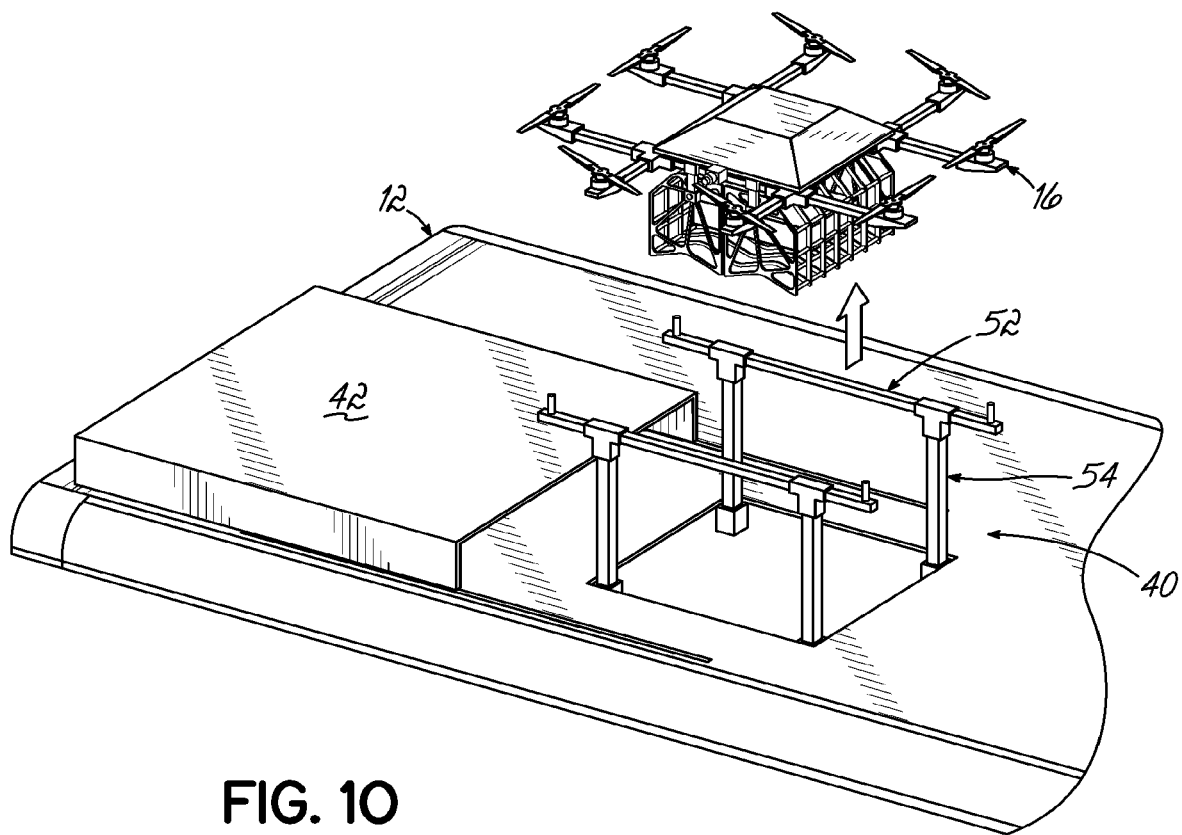
FIG. 10 is a view similar to FIG. 9 with the UAS/UAV in the liftoff position above the delivery vehicle with the package contained within the UAS/UAV's package holding mechanism in route to its destination via autonomous GPS control to the final package delivery coordinates.
Figure 11:
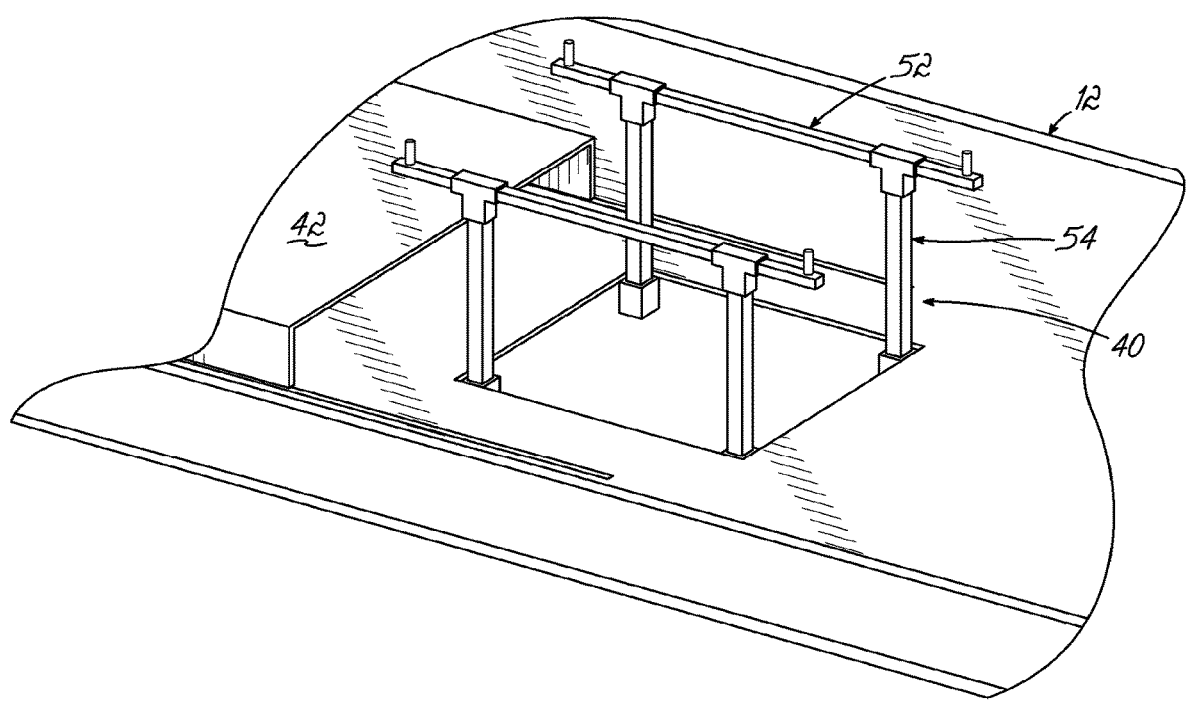
FIG. 11 is a perspective view of one embodiment of infrared (IR) sensors on the ends of the landing platform mechanism to provide a means for guiding the UAS/UAV into the landing position on the platform upon completion of the package delivery sequence.

With the UAS/UAV package loading complete and the delivery destination information contained within the UAS/UAV flight control system 26, the docking station 40 within the delivery vehicle 12 may be raised as depicted in FIGS. 8 and 9, by means of electrical actuators contained within the delivery vehicle 12 to a launch position. It is understood that alternative methods such as hydraulic actuators or other manual means may be utilized to raise the docking station 40.

Figure 14:
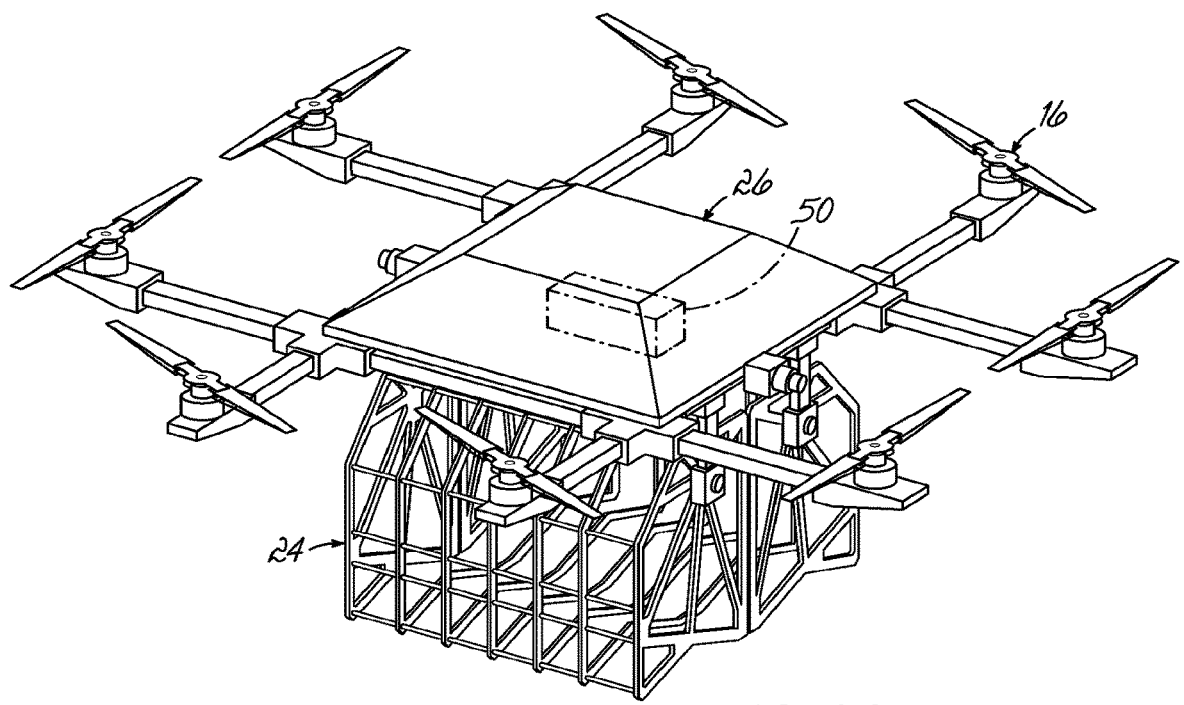
FIG. 14 is a perspective view of one embodiment of the UAS/UAV according to this invention.
Figure 15:
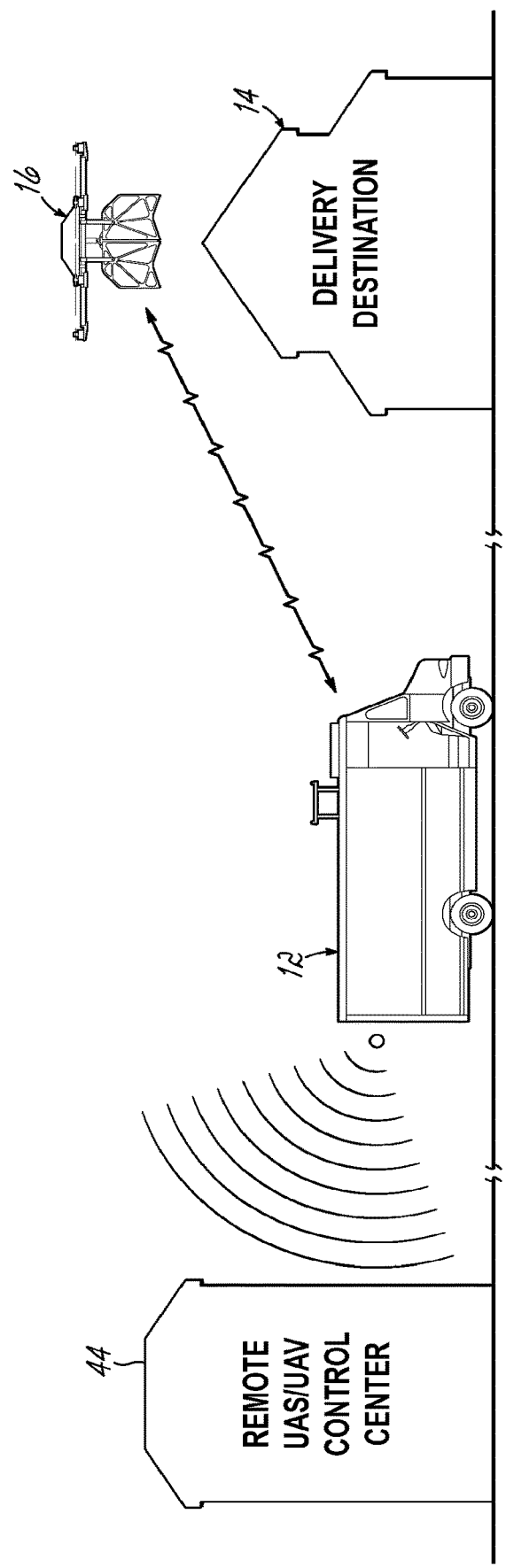
FIG. 15 is a schematic representation of a communication scheme for the UAS/UAV according to one embodiment of this invention.

The UAS/UAV 16 may be launched by the operator with supervision via a remote control center 44 as depicted in FIG. 15, ascend autonomously to the desired flight ceiling and autonomously navigate to the desired delivery destination 14 via preprogrammed GPS coordinates loaded with the UAS/UAV's control system 26. The UAS/UAV flight path is monitored via an onboard telemetry transceiver as part of the flight control system 26, depicted in FIG. 14, by the remote UAS/UAV control center 44 as depicted in FIG. 15.

Figure 13A:
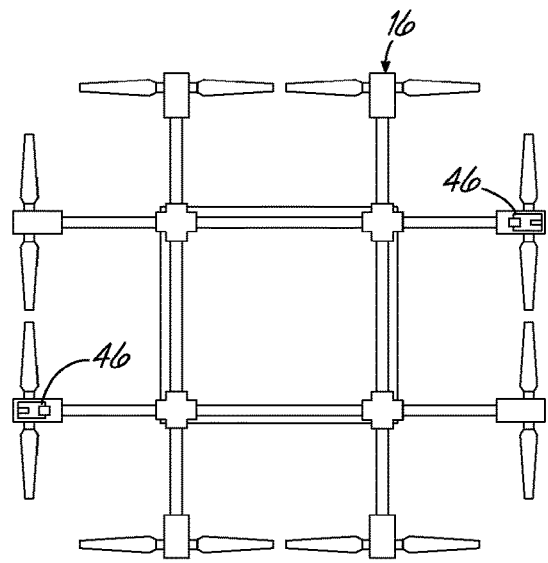
FIGS. 13A-13B depict infrared cameras (sensors) located on selected structural members of the UAS/UAV as to receive precise positional data for proper decent and mating with the docking station integrated into the package delivery vehicle.
Figure 13B:
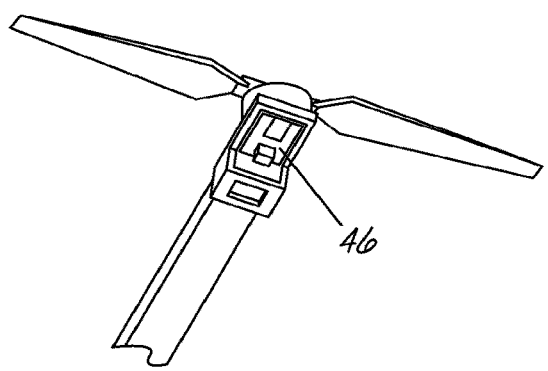

As the UAS/UAV 16 approaches its delivery destination 14, onboard precision land sensors and controls are activated autonomously with manual intervention enabled to guide the UAS/UAV 16 to the final drop off point at the delivery destination 14 via a video feed from cameras 46 onboard the UAS/UAV 16, if necessary, as depicted in FIGS. 13A-13B, to the remote UAS/UAV control center 44 as depicted in FIG. 15. It is understood that other camera configurations are possible in addition to those shown in this embodiment of the invention.

The remote UAS/UAV control center 44 may insure a landing zone 48 at the delivery destination 14 is free of obstructions prior to the final decent of the UAS/UAV. The remote control center 44 supervises the final decent and package drop off via video feed by means of network live streaming video to maintain control of the final phase of package delivery.

Figure 12:
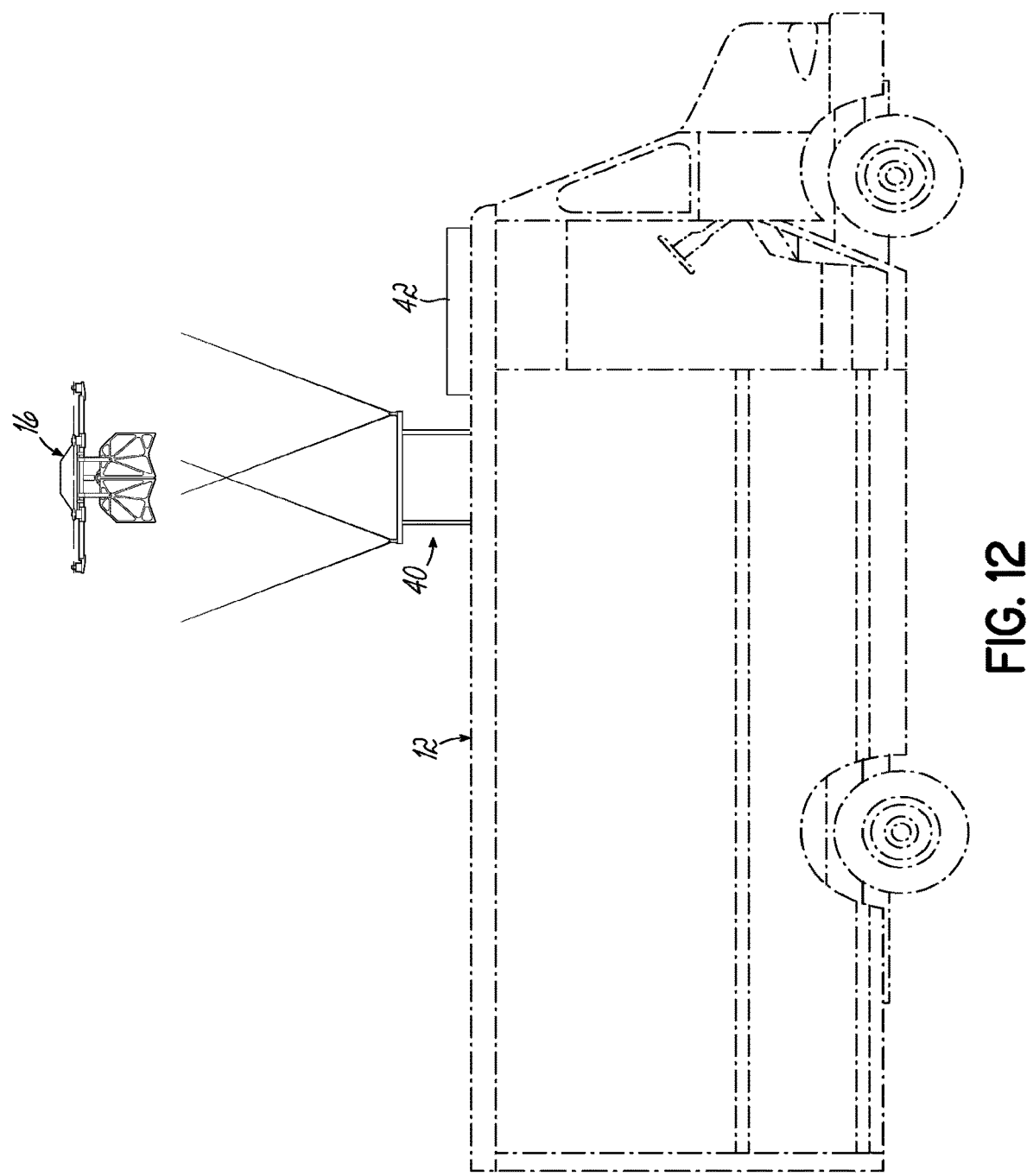
FIG. 12 is a side elevational view one embodiment of this invention wherein the UAS/UAV autonomously descends from its flight ceiling to proximity of the delivery vehicle via GPS control, wherein infrared receiver sensors and software embedded in the UAS/UAV utilizing infrared transmitting sensors contained within the UAS/UAV docking platform guide the UAS/UAV into its docking position on the docking station on top of the delivery vehicle.

Upon completion of the package delivery, the UAS/UAV 16 ascends to the predetermined flight ceiling and autonomously navigates via GPS back to the delivery vehicle 12 as depicted in FIG. 1. When the UAS/UAV 16 is in close proximity of the delivery vehicle 12, the UAS/UAV 16 uses infrared cameras 46 located on principle elements of the UAS/UAV 16 as depicted in FIGS. 13A-13B in conjunction with infrared emitters on the docking station 40 as depicted in FIG. 12 to autonomously land and dock the UAS/UAV 16 on the delivery vehicle 12.

Once the docking of the UAS/UAV 16 is complete, the UAS/UAV 16 and the docking station 40 are lowered into the delivery vehicle 12 and connected to the delivery vehicle onboard charging infrastructure for replenishing the energy supply on the UAS/UAV 16 in preparation for the next UAS/UAV package delivery. In this embodiment of the invention, the UAS/UAV 16 is powered by electrical energy from an electric delivery vehicle, but it is understood that other embodiments of the invention may employ alternate energy sources including, but not limited to, fossil fuels.

A more detailed description of one embodiment of the UAS/UAV 16 and docking station 40 will be described.

One embodiment of the UAS/UAV 16 is depicted in FIGS. 3, 6-10 and 12-14. The UAS/UAV 16 is powered by an onboard battery 50 that can be recharged when docked with the delivery vehicle 12. An onboard computer as part of the flight control system 26 may handle the communication with the delivery vehicle 12 for downloading the coordinates of the delivery destinations 14, while in-flight navigation is done via onboard GPS. Video camera feeds are relayed from the UAS/UAV 16 to the delivery vehicle 12 via an onboard telemetry radio, and then passed from the delivery vehicle 12 to a remote control center 44 via cellular data services.

The UAS/UAV 16 utilizes a package holding mechanism 24 that retains the package 22 during flight, and can release the package 22 when the UAS/UAV 16 lands on the ground at the delivery destination 14, delivery is accomplished and the UAS/UAV 16 leaves the delivery destination 14.

The UAS/UAV 16 utilizes onboard IR-receiver(s) and other technology to orient itself during descent and docking with the delivery vehicle 12. The technology signals that are transmitted by the delivery vehicle 12 are interpreted by the UAS/UAV onboard computer 26 and flight corrections are made autonomously by the UAS/UAV 16.

One embodiment of the docking station 40 as depicted in FIGS. 4-12 includes a structure 52 that the UAS/UAV 16 can land on, the sensor technology used to guide the UAS/UAV 16 during descent, a mechanism 54 that raises and lowers the structure 52 from the loading position to a launch position, and the debris cover 42 which covers the docked UAS/UAV 16 when it is not in flight. The docking station 40 includes a means by which the UAS/UAV onboard battery 50 can be recharged by the delivery vehicle 12 while it is docked. This means is understood to use (but is not limited to) contact charging or wireless charging.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A system to automatically manage an operation of an Unmanned Aerial System (UAS)/Unmanned Aerial Vehicle (UAV) as the UAS/UAV operates to deliver a package to a delivery location, comprising:
    an UAS/UAV control system configured to:
        guide the UAS/UAV from a first location of a delivery vehicle that the UAS/UAV is positioned to the delivery location of the package based on the first location of the delivery vehicle and the delivery location of the package,
        return the UAS/UAV to a second location of the delivery vehicle based on a second location of the delivery vehicle and the location data of the delivery location of the package, wherein the second location of the delivery vehicle differs from the first location of the delivery vehicle, and
        dock the UAS/UAV with the delivery vehicle at the second location of the delivery vehicle.

2. The system of claim 1, wherein the UAS/UAV control system is further configured to:
    upload location data of the delivery location of the package that is associated with the package; and
    launch the UAS/UAV from the first location of the delivery vehicle that the UAS/UAV is positioned into a delivery flight pattern based on the first location of the delivery vehicle and the delivery location of the package.

3. The system of claim 2, wherein the UAS/UAV control system is further configured to:
    guide the UAS/UAV to the delivery destination based on the flight pattern associated with the first location of the delivery vehicle and the delivery destination; and
    land the UAS/UAV at the delivery destination.

4. The system of claim 1, wherein the UAS/UAV control system is further configured to:
    return the UAS/UAV to the second location of the delivery vehicle based on a return flight pattern generated from the second location of the delivery vehicle and the location data of the delivery location of the package, wherein the second location of the delivery vehicle differs from the first location of the delivery vehicle.

5. The system of claim 1, wherein the UAS/UAV control system is further configured to upload location data of the delivery location of the package from a code associated with the package that provides the location data of the delivery location of the package.

6. The system of claim 1, wherein the UAS/UAV control system is further configured to launch the UAS/UAV from the first location of the delivery vehicle that the UAS/UAV is positioned to a prescribed flight ceiling positioned above the first location of the delivery vehicle before traversing on the delivery flight pattern from the first location of the delivery vehicle to the delivery destination.

7. The system of claim 1, wherein the UAS/UAV is launched by the UAS/UAV control system from the delivery vehicle that is an electrically powered delivery vehicle.

8. The system of claim 1, wherein the UAS/UAV control system is further configured to autonomously guide the UAS/UAV to the delivery destination based on GPS coordinates associated with the flight pattern associated with the first location of the delivery vehicle and the delivery destination.

9. The system of claim 1, wherein the UAS/UAV is electrically charged when positioned on the delivery vehicle.

10. The system of claim 1, further comprising:
    at least one sensor associated with the UAS/UAV that detects image data associated with a descent of the UAS/UAV from the prescribed ceiling to the delivery destination after the UAS/UAV hovers above the delivery destination from the prescribed ceiling as the UAS/UAV lands at the delivery destination.

11. A method to automatically manage an operation of an Unmanned Aerial System (UAS)/Unmanned Aerial Vehicle (UAV) as the UAS/UAV operates to deliver a package to a delivery location, comprising:
    guiding, by a UAS/UAV control system, the UAS/UAV from a first location of a delivery vehicle that the UAS/UAV is positioned to the delivery location of the package based on the first location of the delivery vehicle and the delivery location of the package;
    returning the UAS/UAV to a second location of the delivery vehicle based on a second location of the delivery vehicle and the location data of the delivery location of the package, wherein the second location of the delivery vehicle differs from the first location of the delivery vehicle; and
    docking the UAS/UAV with the delivery vehicle at the second location of the delivery vehicle.

12. The method of claim 11, wherein the guiding comprises:
    uploading location data of the delivery location of the package that is associated with the package; and
    launching the UAS/UAV from the first location of the delivery vehicle that the UAS/UAV is positioned into a delivery flight pattern based on the first location of the delivery vehicle and the delivery location of the package.

13. The method of claim 12, wherein the guiding further comprises:
    guiding the UAS/UAV to the delivery destination based on the flight pattern associated with the first location of the delivery vehicle and the delivery destination; and
    landing the UAS/UAV at the delivery destination.

14. The method of claim 13, wherein the returning comprises:
    returning the UAS/UAV to the second location of the delivery vehicle based on a return flight pattern generated from the second location of the delivery vehicle and the location data of the delivery location of the package, wherein the second location of the delivery vehicle differs from the first location of the delivery vehicle.

15. The method of claim 11, wherein the guiding further comprises:
    uploading location data of the delivery location of the package from a code associated with the package that provides the location data of the delivery location of the package.

16. The method of claim 11, wherein the guiding further comprises:
    launching the UAS/UAV from the first location of the delivery vehicle that the UAS/UAV is positioned to a prescribed flight ceiling positioned above the first location of the delivery vehicle before traversing on the delivery flight pattern from the first location of the delivery vehicle to the delivery destination.

17. The method of claim 16, further comprising:
  detecting by at least one sensor associated with the UAS/UAV image data associated with a descent of the UAS/UAV from the prescribed flight ceiling to the delivery destination after the UAS/UAV hovers above the delivery destination from the prescribed ceiling as the UAS/UAV lands at the delivery destination.

18. The method of claim 11, wherein the guiding further comprises:
  launching the UAS/UAV from the delivery vehicle that is an electrically powered delivery vehicle.

19. The method of claim 11, wherein the guiding further comprises:
  autonomously guiding the UAS/UAV to the delivery destination based on GPS coordinates associated with the flight pattern associated with the first location of the delivery vehicle and the delivery destination.

20. The method of claim 11, further comprising:
  electrically charging the UAS/UAV when positioned on the delivery vehicle.

* * * * *